Feb. 28, 1967     J. M. SMILEY     3,306,140
GEAR OPERATED WRENCH

Filed Oct. 11, 1965     3 Sheets-Sheet 1

INVENTOR.
James M. Smiley
BY
Robert F. Bock
ATTORNEY

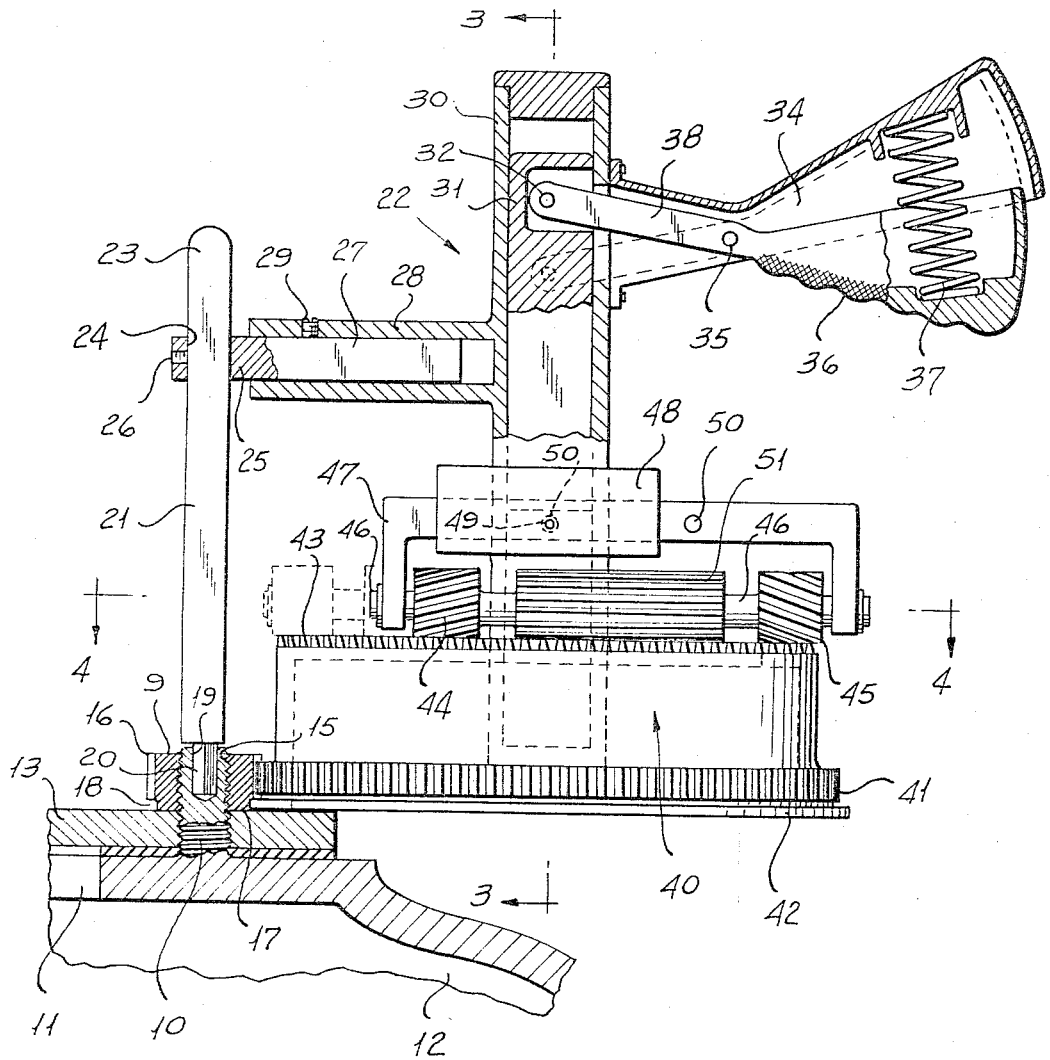

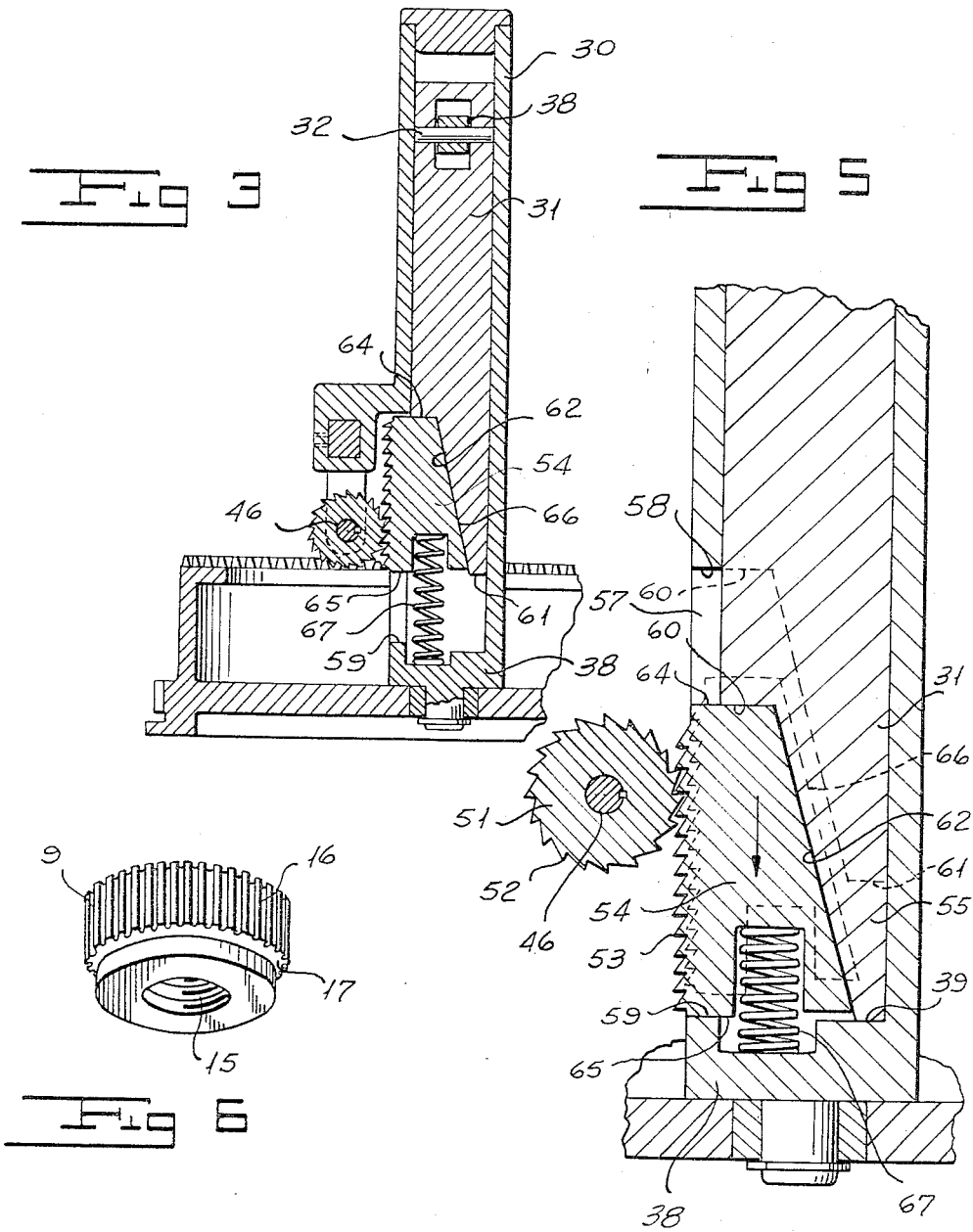

3,306,140
GEAR OPERATED WRENCH
James M. Smiley, Wayne, N.J.
(818 Ramapo Ave., Pompton Lakes, N.J. 07442)
Filed Oct. 11, 1965, Ser. No. 494,749
7 Claims. (Cl. 81—56)

My invention relates to tools and more particularly to wrenches for rotating fastening devices, such as nuts, screws and the like.

One of the objects of my invention is to provide a tool capable of use in a state of weightlessness whereby an astronaut, without gravity to constitute an anchor, can secure or remove rotatable fastening devices in space while in orbit.

Another object of my invention is to provide a fastening device for use in conjunction with the aforementioned tool.

A further object of my invention is to provide a tool of the foregoing described character, which is simple in construction, durable in use, efficient in operation, economical to manufacture and lends itself to a multiplicity of uses in both states of weightlessness and gravity.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 2 is a vertical sectional view of my invention;

FIGURE 3 is a sectional view taken on line 3—3 of FIGURE 2;

FIGURE 5 is an enlarged fragmentary sectional view of the ratchet mechanism illustrated in FIGURE 4; and FIGURE 6 is a perspective view of one of the nuts.

Figure 1:
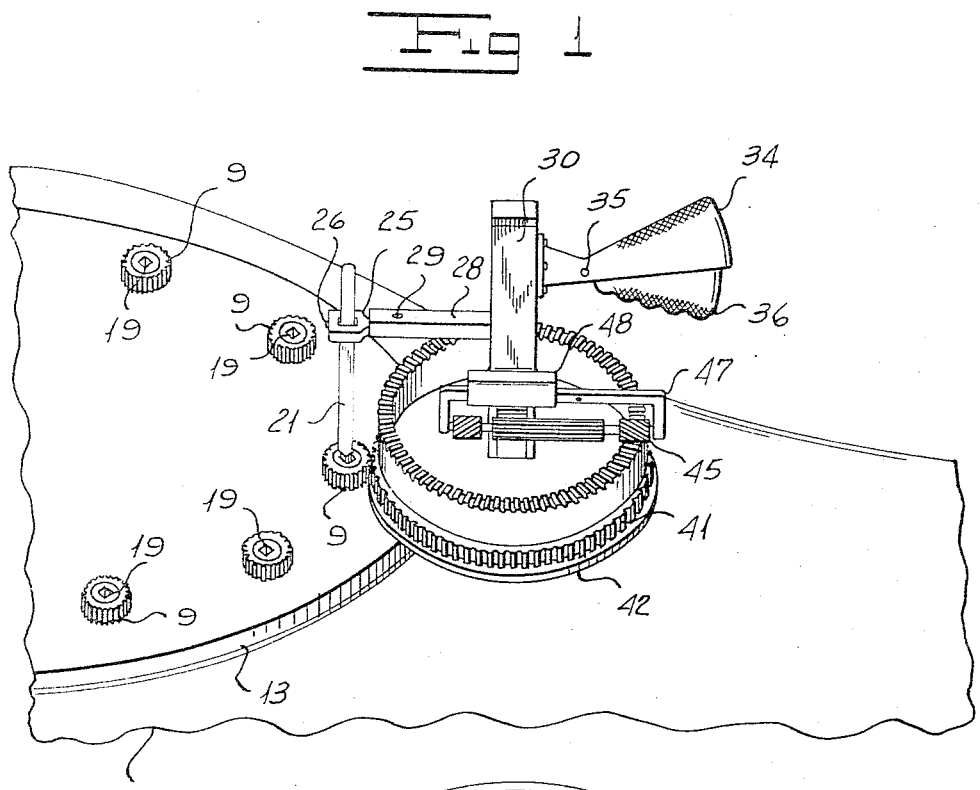
FIGURE 1 is a perspective view of my invention illustrating the same in position for removing nuts of a hatch cover of a space vehicle.
Figure 4:
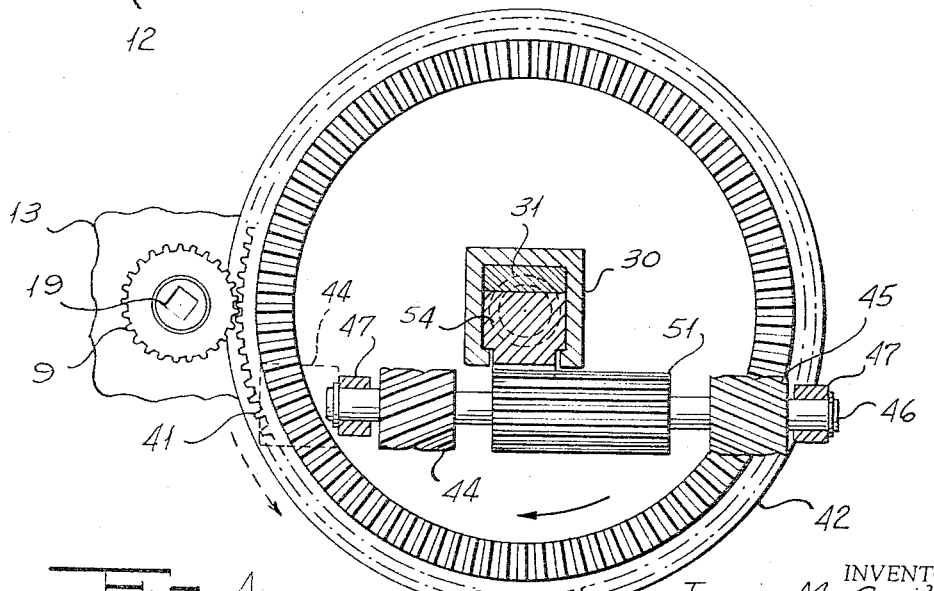
FIGURE 4 is a sectional view taken on line 4—4 of FIGURE 2.

In practicing my invention, as illustrated in the drawings, I provide fastening devices comprising nuts 9 threaded onto studs 10 surrounding the hatch opening 11 of a space vehicle 12 and which studs 10 project through openings in the hatch cover 13 for closing the opening. As shown, each of the nuts 9 is provided with threaded openings 15 and equipped on its outer periphery with teeth 16. A collar 17 is provided on the nut which engages the cover 13 and is of a diameter less than the dedendum circle of the teeth 16 to define between the teeth and cover, a groove 18 (FIGURE 2) for a purpose hereinafter more fully described. Each of the studs 10 is centrally formed with a square-shaped socket 19 opening through its outer radial face and in which is received a similar shaped inner end section 20 formed on a stabilizing rod 21 of the wrench 22.

The outer end section 23 of the rod 21 extends through an opening 24 in a yoke 25 and is lengthwise adjustably secured therein by a set-screw 26. The yoke 25 constitutes the outer end of a bar 27 slidably mounted within a sleeve or holder 28 and is adjustably fixed therein by a set-screw 29.

The holder 28 is secured in fixed relation with a housing or barrel 30 of the wrench 22 and which barrel extends in parallelism with the rod 21. The barrel 30 encloses and has slidably mounted therein, adjacent one end, a slide member 31. One end of the slide has pivoted thereto, as at 32, one end of a trigger or lever 33 (see FIGURE 2). The lever 33 is pivoted between its ends, as at 34, within a housing or hand grip 34 carried by the barrel 30. One side of the housing or grip is open and through which extends a finger grip portion 30 of the lever 33 for operating the latter. A spring 37 is interposed between the portion 36 of the lever and the housing 34 for urging the lever outwardly relative to the housing.

The opposite end of the barrel 30 is provided with an end wall 38 having an inner face 39 and which barrel, adjacent the inner face, has rotatably mounted thereon a gear-drum 40 equipped at one side with a ring gear 41 for meshing with the teeth 16 of the nuts 9. Adjacent the gear 41, the side of the drum 40 is provided with a stabilizing flange 42 for seating in the groove 18 between the teeth 16 of the nuts 9 and the cover 13. The opposite side of the drum is provided on its radial face with gear teeth 43 for selective meshing with the teeth of a pair of spaced driving gears 44 and 45 to effect clockwise or counter-clockwise rotation of the drum 40, respectively.

The gears 44 and 45 are fixed to a shaft 46 rotatably mounted in a yoke or bracket 47 slidable within a case 48 fixed to the barrel 30. The case 48 is provided with a spring-pressed detent 49 for cooperating with sockets 50 on the bracket 47, whereby the bracket may be positioned to effect selective meshing of the gears 44 and 45 with the teeth 43 of the drum 40 to obtain the desired rotational direction of the drum.

Ratchet mechanism is provided for manually operating the wrench by a squeeze action of the operator and comprises a ratchet gear 51 fixed on the shaft 46 for rotating the latter and the gears 44 and 45 by meshing of its teeth 52 with the teeth 53 of a slidable rack bar 54 positioned within the barrel 30 and a cuneiform portion 55 of the opposite end of the slide 31. One side of the barrel 30 is formed with a slot 57 defined by confronting spaced end faces 58 and 59 between which the bar 54 may operate lengthwise and, as hereinafter made apparent in some instances, transversely. The portion 55 of the slide 31 is defined by a pair of end faces 60 and 61 and an inclined surface 62 extending therebetween.

Similarly, the rack bar 54 is provided with end faces 64 and 65 and an inclined surface 66 extending between the faces 64 and 65. A spring 67 is interposed between the end wall 38 and the rack bar 54 for urging the rack bar in a direction away from the end wall 38.

In use—assuming the parts are in the positions shown in FIGURES 1, 3 and 5 with the set-screws 26 and 29 tightened to maintain the rod 21 and bar 27 in fixed relation with the barrel 30—the operator grasps the grip 34 with one hand and with the fingers thereof disposed about the grip portion 30 of the lever 33 squeezes the portion 30 into the grip 34 with the result that the slide 31 will be moved and which in turn will actuate the rack bar 54. In this phase of the operation, the teeth 53 of the rack bar will engage the teeth 52 of the gear 51 and effect rotation of the latter with the result that shaft 46 and gear 45 will in turn be rotated and effect coincident rotation of the gear drum 40. Inasmuch as the teeth 41 of the gear 40 are in mesh with the teeth 16 of the nut 9, the latter will be rotated to effect unscrewing of the nut 9 from the stud 10, thereby permitting, when all of the nuts are removed from the studs, removal of the hatch cover 13. Release of the fingers from the portion 30 effects retraction of the slide 31 by means of the spring 37. As the slide is retracted, a space equal to the depth of the teeth 53 of the block 44 will develop between the inclined surface 62 of the slide and the inclined surface 66 of the rack bar to permit the spring 67 which has been compressed, to ratchet the teeth 53 relative to the teeth 52 of the ratchet gear 51 as shown in dotted lines in FIGURE 5. It is to be noted that the same operation may be resorted to, if necessary, to effect complete removal of the nuts from the studs. When it is desired to screw the nuts onto the studs, the bracket 47 is shifted relative to the case 48 to effect meshing of the gear 47 with the teeth 43 of the drum 40, whereby a reverse rotation of the drum is obtained by the same squeezing action of the operator.

From the foregoing, it will be apparent that I have provided a wrench capable of operation in a condition of weightlessness as well as that of gravity and which wrench comprises a relatively simple ratchet mechanism operated by the squeezing of the hand of the operator.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claims. It is to be understood that the language used herein and in the claims is intended to cover all the generic and specific features of the invention herein described, and all statements of the scope of the invention which, as a matter of language, may be said to fall therebetween.

What is claimed is:

1. Means for rotating a movable member relative to a stationary member, comprising a housing, a gear rotatably mounted on said housing and adapted to mesh with teeth on the movable member for rotating the latter, ratchet mechanism carried by said housing and connected to said gear for rotating said gear, manually operated means carried by said housing and connected to said ratchet mechanism for operating the latter upon squeezing of said means by an operator to render said mechanism effective, and stabilizing means carried by said housing and adapted to engage said members whereby to maintain said gear in operative position during said squeezing.

2. Means for rotating a movable member relative to a stationary member, comprising a housing, a gear rotatably mounted on said housing and adapted to mesh with teeth on the movable member for rotating the latter, ratchet mechanism carried by said housing and connected to said gear for rotating said gear, manually operated means carried by said housing and connected to said ratchet mechanism for operating the latter upon squeezing of said means by an operator to render said mechanism effective, and stabilizing means adapted to engage said members to maintain said gear in operative position during said squeezing, and including a rod adjustably mounted on said housing and a flange fixed to said gear and coacting with said rod.

3. Means for rotating a movable member relative to a stationary member, comprising a housing, a gear rotatably mounted on said housing and adapted to mesh with teeth on the movable member for rotating the latter, ratchet mechanism carried by said housing, gearing carried by said housing and connected between said mechanism and said gear for rotating said gear by said mechanism, manually operated means carried by said housing and connected to said ratchet mechanism for operating the latter upon squeezing thereof by an operator to render said mechanism effective, and stabilizing means carried by said housing and adapted to engage said members whereby to maintain said gear in operative position during said squeezing, said gearing being selectively shifted to positions to effect rotation of said gear in other than one direction.

4. Means for rotating a movable member relative to a stationary member, comprising a housing, a gear rotatably mounted on said housing and adapted to mesh with teeth on the movable member for rotating the latter, ratchet mechanism carried by said housing, gearing carried by said housing and connected between said mechanism and said gear for rotating said gear by said mechanism, manually operated means carried by said housing and connected to said ratchet mechanism for operating the latter upon squeezing thereof by an operator to render said mechanism effective, a rod adjustably mounted on said housing for engaging said stationary member, and a flange carried by said gear for engaging said stationary member and coacting with said rod to maintain said gear in meshed relation with said movable member during rotation of said gear.

5. A wrench for rotating a cylindrical nut relative to a stud fixed to a stationary member and with the stud formed with a centrally disposed socket and the nut provided with teeth about its periphery and a collar for spacing the teeth from the member to form a groove between the teeth and member, said wrench comprising a housing, a gear rotatably mounted on said housing for meshing with the teeth of said nut for rotating the latter, ratchet mechanism carried by said housing and connected to said gear for rotating said gear, manually operated means carried by said housing and connected to said ratchet mechanism for operating the latter and effective upon squeezing thereof by the hand of an operator to render said mechanism effective, and stabilizing means carried by said housing and including a rod for engaging said stud and a flange carried by said gear for extending into the groove and engaging the member whereby to maintain said wrench in an operative position relative to the nut.

6. In combination with a cylindrical nut adapted to be threaded on a stud fixed to a stationary member and with the stud being formed with a centrally disposed socket, said nut being provided with teeth about its periphery and a collar for spacing said teeth from the member to form a groove between the teeth and the member, and a wrench having a gear meshing with said teeth for rotating said nut relative to the stud, power means connected to said gear for rotating the latter, manually operated means connected to said power means for operating the latter and effective upon a squeeze action by the operator, and stabilizing means carried by said wrench and including a rod extending into said socket and a flange carried by said gear for extending into the groove and engaging the member whereby to maintain said wrench in an operative position relative to said nut.

7. A wrench for rotating a nut relative to a stationary component and comprising, a housing, a rotatable member mounted on siad housing and adapted to engage the nut for rotating the latter relative to the component, reciprocating mechanism carried by said housing and connected to said member for rotating the latter, squeeze actuated means carried by said housing and connected to said mechanism for operating the latter upon squeezing by the operator, and stabilizing means carried by said housing for engaging the component whereby to maintain said wrench in an operative position relative to the nut.

References Cited by the Examiner

UNITED STATES PATENTS

| | | | |
|---|---|---|---|
| 919,260 | 4/1909 | Smith | 81—58.1 X |
| 1,343,667 | 10/1921 | Evensen | 81—54.5 X |
| 2,421,901 | 6/1947 | Murad et al. | 81—54.5 X |
| 2,831,384 | 4/1958 | Weiss | 81—60 X |
| 3,247,741 | 4/1966 | Batten | 81—56 |

JAMES L. JONES, Jr., *Primary Examiner.*